US011299322B2

(12) United States Patent
Lee

(10) Patent No.: US 11,299,322 B2
(45) Date of Patent: Apr. 12, 2022

(54) STACKABLE SAWBLADE CONTAINMENT ASSEMBLY

(71) Applicant: John Lee, Riverside, CA (US)

(72) Inventor: John Lee, Riverside, CA (US)

( * ) Notice: Subject to any disclaimer, the term of this patent is extended or adjusted under 35 U.S.C. 154(b) by 105 days.

(21) Appl. No.: 16/595,796

(22) Filed: Oct. 8, 2019

(65) Prior Publication Data

US 2021/0101717 A1  Apr. 8, 2021

(51) Int. Cl.
| | | |
|---|---|---|
| B65D 85/58 | (2006.01) |
| B65D 85/00 | (2006.01) |
| B65D 21/02 | (2006.01) |
| B25H 3/00 | (2006.01) |
| B25H 3/02 | (2006.01) |
| B23D 59/00 | (2006.01) |
| B65D 85/02 | (2006.01) |
| B65D 73/00 | (2006.01) |

(52) U.S. Cl.
CPC ......... *B65D 21/0228* (2013.01); *B23D 59/00* (2013.01); *B25H 3/00* (2013.01); *B65D 73/0064* (2013.01); *B65D 85/02* (2013.01); *B65D 85/58* (2013.01)

(58) Field of Classification Search
CPC ........... B65D 21/0228; B65D 73/0064; B65D 85/02; B65D 85/58; B65D 81/02; B65D 85/62; B65D 73/0014; B65D 25/22; B23D 59/00; B25H 3/00; B25H 3/006
USPC .... 206/349, 303, 493, 806, 372, 471, 308.1, 206/309, 503–513
See application file for complete search history.

(56) References Cited

U.S. PATENT DOCUMENTS

| | | | | |
|---|---|---|---|---|
| 2,459,460 A | * | 1/1949 | Segal ................... | B65D 85/58 206/349 |
| 2,471,173 A | * | 5/1949 | Taylor .................. | B65D 65/06 206/303 |
| 2,601,426 A | * | 6/1952 | Baumann .............. | B65D 85/02 206/349 |
| 2,950,004 A | * | 8/1960 | Acomb ................ | B65D 75/305 206/349 |
| 3,053,424 A | * | 9/1962 | Reinhard .............. | B25H 3/006 294/163 |
| 3,259,231 A | * | 7/1966 | Romanowski ......... | B65D 85/58 206/349 |
| 4,588,082 A | * | 5/1986 | Ridings .................. | A45C 3/00 206/303 |

(Continued)

*Primary Examiner* — Gideon R Weinerth
(74) *Attorney, Agent, or Firm* — Tommy S F Wang; Wang IP Law Group, P.C.

(57) ABSTRACT

A stackable sawblade containment assembly comprises a plurality of annular covers and an outer lip. The plurality of annular covers is defined by an outer perimeter, wherein each of the annular cover comprises a containment face and a base face, wherein at least one protrusion and at least one depression are coupled to the annular cover. The outer lip is disposed to extend along the outer perimeter and extending from the containment face. The at least one protrusion is disposed in general alignment with the at least one depression, whereby the at least one protrusion is configured to form a snap-fit relationship with the at least one depression. The containment face from one of the plurality of annular covers, and the base face from another one of the plurality of annular covers are detachably connected, forming an inner cavity and a stacked arrangement of annular covers.

19 Claims, 5 Drawing Sheets

(56) References Cited

U.S. PATENT DOCUMENTS

| | | | | |
|---|---|---|---|---|
| 5,456,057 A * | 10/1995 | Bannon | B65D 75/004 | 53/449 |
| 5,634,559 A * | 6/1997 | Foos | B65D 11/188 | 206/308.1 |
| 6,029,815 A * | 2/2000 | Ali | B65D 73/0028 | 206/303 |
| 6,161,693 A * | 12/2000 | Findle | B65D 73/0071 | 206/349 |
| 6,164,447 A * | 12/2000 | Svetlik | B23D 59/00 | 206/373 |
| 6,267,239 B1 * | 7/2001 | Maki | B23D 59/00 | 206/303 |
| 6,427,832 B1 * | 8/2002 | Ali | B65D 11/02 | 206/303 |
| 6,446,797 B1 * | 9/2002 | Shiga | B65D 43/162 | 206/303 |
| 6,729,468 B1 * | 5/2004 | Dobmeier | B23D 59/00 | 206/303 |
| 6,868,966 B2 * | 3/2005 | German, III | B23D 47/00 | 206/303 |
| 7,066,327 B2 * | 6/2006 | Baublitz | B65D 75/22 | 206/303 |
| 7,191,898 B1 * | 3/2007 | Williams | B25H 3/02 | 206/303 |
| 8,622,211 B2 * | 1/2014 | Zorc | B65D 73/005 | 206/349 |
| 9,238,300 B2 * | 1/2016 | Wang | B65D 25/54 | |
| D782,295 S * | 3/2017 | Lee | B65D 75/305 | D9/415 |
| 10,512,999 B2 * | 12/2019 | Behringer | B27G 19/04 | |
| 10,981,717 B2 * | 4/2021 | Mahugh | B65D 85/02 | |
| 2004/0020806 A1 * | 2/2004 | German | B23D 47/00 | 206/349 |
| 2005/0133389 A1 * | 6/2005 | Baublitz | B65D 75/22 | 206/303 |
| 2009/0261005 A1 * | 10/2009 | Kasubowski | B23D 59/00 | 206/349 |
| 2010/0072093 A1 * | 3/2010 | Cross | B27B 5/29 | 206/349 |
| 2012/0273376 A1 * | 11/2012 | Nicholls | B65D 85/58 | 206/349 |
| 2013/0015197 A1 * | 1/2013 | Gauthier | B65D 83/0454 | 221/82 |
| 2014/0262872 A1 * | 9/2014 | Helm | G11B 33/0427 | 206/308.1 |
| 2017/0253408 A1 * | 9/2017 | Strassburger | G08B 13/2434 | |
| 2017/0282350 A1 * | 10/2017 | Wilson | B25H 3/00 | |
| 2018/0013116 A1 * | 1/2018 | Dorr | B65D 79/02 | |
| 2018/0099780 A1 * | 4/2018 | Lee | B65D 25/205 | |
| 2020/0223617 A1 * | 7/2020 | Mahugh | B65D 85/62 | |
| 2021/0101717 A1 * | 4/2021 | Lee | B23D 59/00 | |

* cited by examiner

STACKABLE SAWBLADE CONTAINMENT ASSEMBLY

TECHNICAL FIELD OF THE INVENTION

The present application generally relates to sawblade containment assembly, and more particularly, to a stackable sawblade containment assembly.

BACKGROUND OF THE INVENTION

Generally, a saw is a tool consisting of a tough blade, wire, or chain with a hard toothed edge. It is used to cut through material, most often wood. The cut is made by placing the toothed edge against the material and moving it forcefully forth and less forcefully back or continuously forward. A circular blade saw is a circular blade which spins, usually by a power tool. Circular saws can be large for use in a mill or hand held up to 24" blades and different designs cut almost any kind of material including wood, stone, brick, plastic, etc.

Generally, circular sawblades with angled teeth are used extensively for cutting any material mainly because of their rapid and accurate cutting action and ability to cut for a reasonable period of duration without sharpening. A circular sawblade contains a hole in the center and is of a planar design with peripheral teeth. Circular sawblades come in various diameters as well as various sawblade thicknesses since they are designed for cutting specific material such as wood, metal or masonry.

It is known that the angled teeth of circular sawblades are precision cutting tools, the user must apply care when storing and handling sawblades in order to safeguard against both moisture, which rusts metal blades and negatively affects the blades cutting performance, or contact with other blades and tools, which may lead to dulled cutting teeth.

Other proposals have involved storing circular sawblades. The problem with these storage devices is that they do not enable stacked, efficient storage capacity of the sawblades. Also, the blades slide loosely inside the container causing damage to the teeth. Even though the above cited blade storage devices meets some of the needs of the market, a containment assembly that contains at least one sawblade within cavities formed through stacked arrangement of a plurality of stackable annular covers, and an outer lip on an outer perimeters of the annular covers to inhibit lateral slippage of the sawblade is still desired.

SUMMARY OF THE INVENTION

The present application discloses a stackable sawblade containment assembly to provide an efficient storage capacity and a better protection for the sawblades.

The stackable sawblade containment assembly comprises a plurality of annular covers and an outer lip. The plurality of annular covers is defined by an outer perimeter, wherein each of the annular cover comprises a containment face and a base face, wherein at least one protrusion and at least one depression are coupled to the annular cover. The outer lip is disposed to extend along the outer perimeter and extending from the containment face. The at least one protrusion is disposed in general alignment with the at least one depression, whereby the at least one protrusion is configured to form a snap-fit relationship with the at least one depression. The containment face from one of the plurality of annular covers, and the base face from another one of the plurality of annular covers are detachably connected, forming an inner cavity and a stacked arrangement of annular covers.

In various exemplary embodiments, the stackable sawblade containment assembly further comprises a flange and a flange cover. The flange is disposed to extend from the outer perimeter of the plurality of annular covers. The flange cover is defined by a ridged edge, wherein the flange comprises a flange depression defined by a depressed edge, the flange cover is configured to cover the flange depression, whereby the ridged edge of the flange cover forms a snap-fit relationship with the depressed edge of the flange depression. The flange depression is configured to enable retention of a tag. The tag is configured to identify the plurality of annular covers and the at least one sawblade, the tag further configured to position in the flange depression. The flange depression has a generally rectangular shape as an example in the present application.

In various exemplary embodiments, the stackable sawblade containment assembly further comprises a flange disposed to extend from the outer perimeter of the plurality of annular covers. The at least one protrusion and the at least one depression are located at the flange.

In various exemplary embodiments, the stackable sawblade containment assembly further comprises a flange disposed to extend from the outer perimeter of the plurality of annular covers. The flange comprises an elongated slot.

In various exemplary embodiments, the stackable sawblade containment assembly further comprises a flat extension disposed to extend from the outer perimeter of the plurality of annular covers. The flat extension is diametrically opposed from the flange. The flat extension is configured to enable upright standing of the plurality of annular covers. At least one recess located on the flat extension. The at least one protrusion and the at least one depression are located at the flat extension.

In various exemplary embodiments, wherein the plurality of annular covers is at least partially transparent.

In various exemplary embodiments, wherein the plurality of annular covers is fabricated from a polymer.

In various exemplary embodiments, wherein the inner cavity is defined by the outer lip and is adapted to enable containment of at least one sawblade. The outer lip is configured to inhibit lateral shifting by the at least one sawblade. The plurality of annular covers is configured to be stacked, and with each set of annular covers containing the at least one sawblade.

In various exemplary embodiments, the plurality of annular covers has a diameter between the outer perimeters between 22 to 30 inches.

In various exemplary embodiments, the stackable sawblade containment assembly further comprises a top cover comprising at least one depression.

Based on the above, the stackable sawblade containment assembly of the present application can provide the efficient storage capacity for the sawblades by stacking the plurality of sawblades within one containment assembly. The depression and the protrusion provide the user a more stable and easier way to assemble and dissemble the stackable sawblade containment assembly.

In addition, the flat extension may also allow the user to stand the stackable sawblade containment assembly uprightly, making the overall storage more convenient. Furthermore, the flange depression allows the user to put the tag to differentiate different sawblades. The transparent structure may provide clearer vision.

Numerous other advantages and features of the present application will become readily apparent from the following detailed description of disclosed embodiments, from the claims and from the accompanying drawings.

BRIEF DESCRIPTION OF THE DRAWINGS

The objects, features and advantages of the present application will be more readily appreciated upon reference to the following disclosure when considered in conjunction with the accompanying drawings, wherein like reference numerals are used to identify identical components in the various views, and wherein reference numerals with alphabetic characters are utilized to identify additional types, instantiations or variations of a selected component embodiment in the various views, in which.

DETAILED DESCRIPTION OF DISCLOSED EMBODIMENTS

Figure 1:
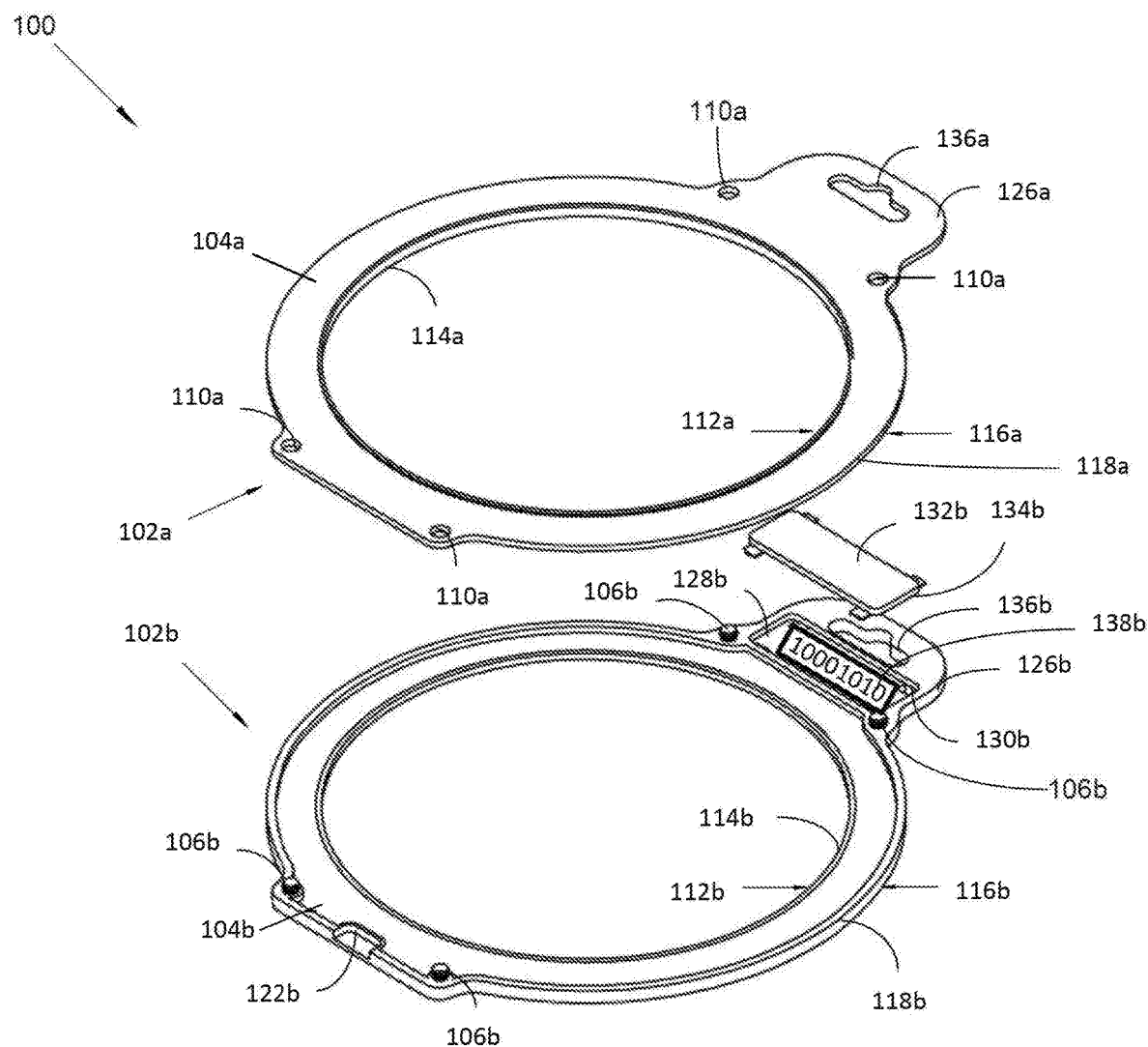
FIG. 1 illustrates a perspective view of an annular cover and a top cover of the present application.

Reference will now be made in detail to the present representative embodiments of the present application, examples of which are illustrated in the accompanying drawings. Wherever possible, the same reference numbers are used in the drawings and the description to refer to the same or like parts.

A stackable sawblade containment assembly 100 is referenced in FIGS. 1-8. The stackable sawblade containment assembly 100, hereafter "assembly 100" is adapted to securely contain at least one sawblade within inner cavities 120a/120b (in FIG. 6) that from through the stacked arrangement of a top cover 102a and a plurality of annular covers 102b/102c (in FIG. 6). Each annular cover 102b/102c is identical. The uses of base face 108a, containment faces 104b/104c and base faces 108b/(not shown) that mate together in a snap fit relationship to form the inner cavities 120b/120b that contain the sawblades 200 (in FIG. 7). In essence, providing an efficient, secure solution for single and multi-carbide blade merchandise display, packaging, storage, and quick identification for access to the blades.

FIG. 1 illustrates a perspective view of a top cover 102a an annular cover 102b of the present application.

As referenced in FIG. 1, the assembly 100 comprises the top cover 102a and at least one annular covers 102b. The top cover 102a and the annular cover 102b have a generally ring-shape that is sized and dimensioned to contain at least one sawblade 200 (referring to FIG. 7). The top cover 102a and the annular cover 102b may also be transparent to enable quick identification and viewing of the at least one sawblade 200 (referring to FIG. 7). Though in some embodiments, the top cover 102a and the annular cover 102b may have various colors, patterns, and logos integrated therein. Suitable materials for the top cover 102a and the annular cover 102b may include, without limitation, polyurethane, polyethylene, polyvinyl chloride, silicone, and a rigid polymer.

Figure 2:
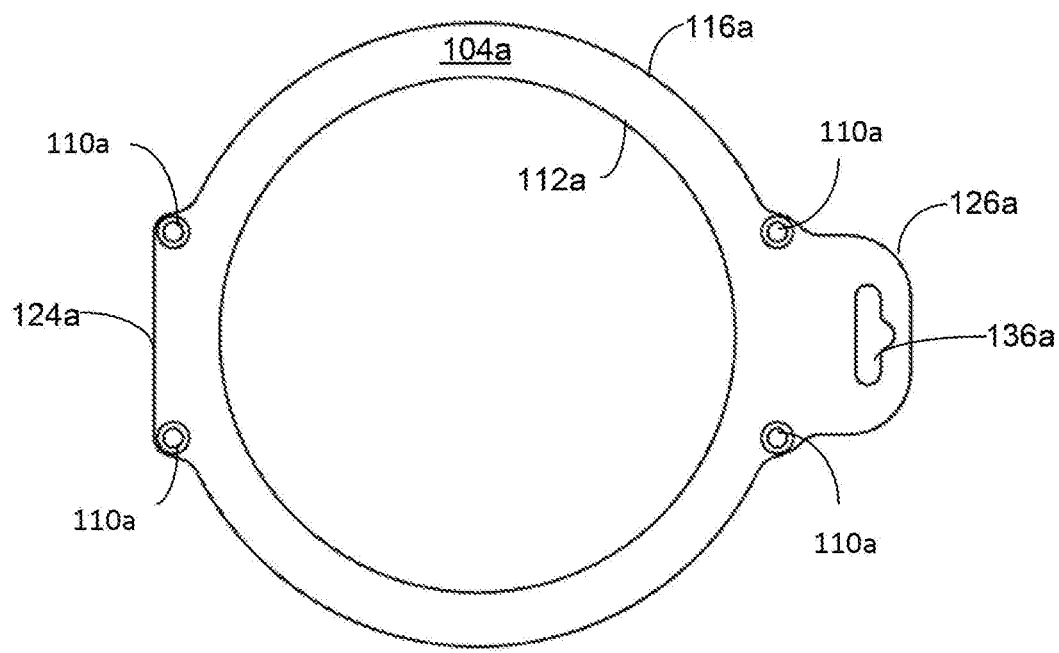
FIGS. 2-3 illustrates a top view and a bottom view of the top cover.
Figure 3:
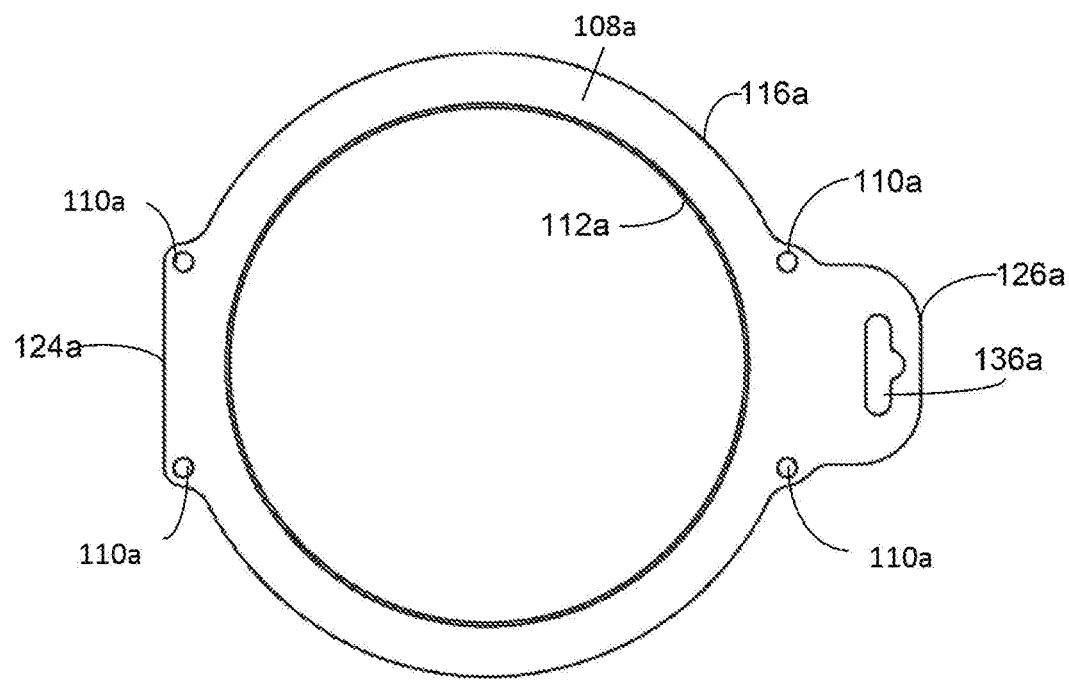
Figure 4:
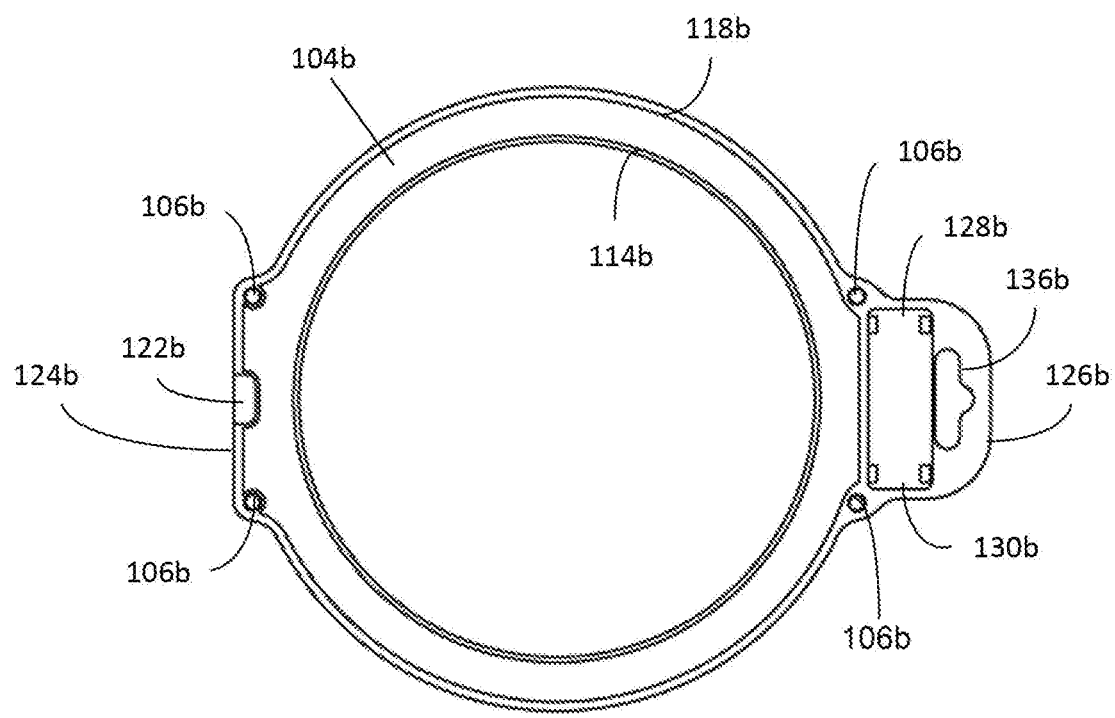
FIGS. 4-5 illustrates a top view and a bottom view of the annular cover.
Figure 5:
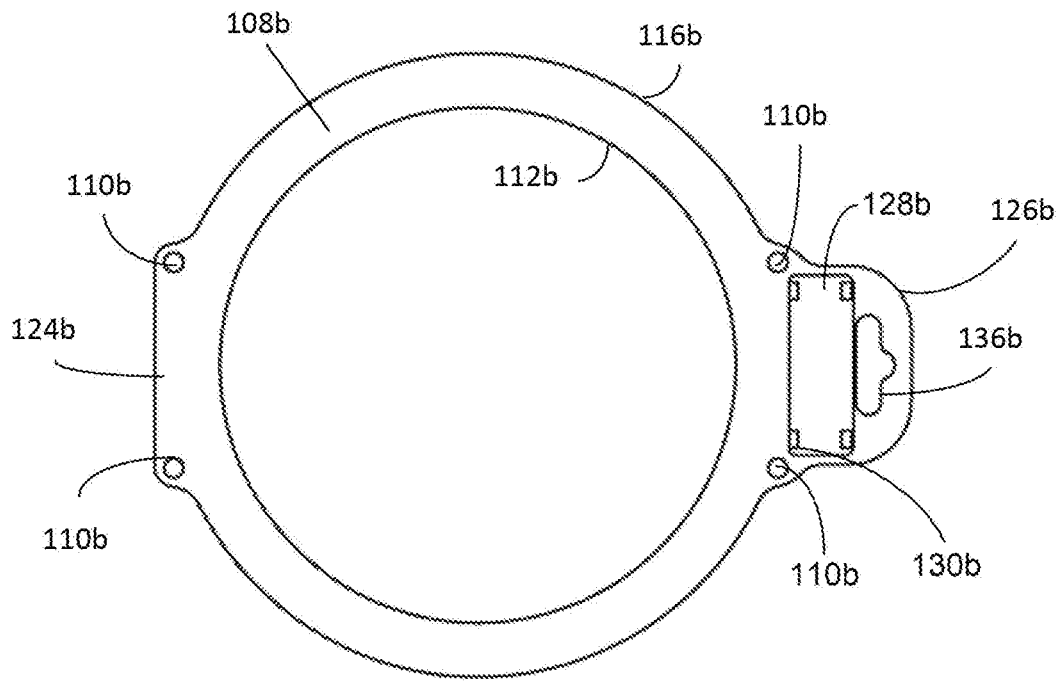

FIGS. 2-3 illustrates a top view and a bottom view of the top cover 102a. FIGS. 4-5 illustrates a top view and a bottom view of the annular cover 102b.

Turning now to FIGS. 1-3, the top cover 102a comprises a top base 104a, the base face 108a, at least one depression 110a, a flat extension 124a and a flange 126a. Referring to FIGS. 1 and 4-5 the annular cover 102b comprises a containment face 104a, a base face 108b, at least one protrusion 106b, at least one depression 110b. The base face 108a is the side that covers an adjacent sawblade 200 (referring to FIG. 7) in the adjacent containment face 104b. The containment face 104b is the side that receives the sawblade 200 (referring to FIG. 7). The base face 108a and base face 108b are generally flat, so as to provide a stable surface for the sawblade and minimize warping effects.

The generally annular, or ring, shape of the top cover 102a forms an inner perimeter 112a, and an outer perimeter 116a with an opening formed inside the inner perimeter 112a. The generally annular, or ring, shape of the annular cover 102b forms an inner perimeter 112b, and an outer perimeter 116b with an opening formed inside the inner perimeter 112b. This annular shape is designed to follow the general shape of a typical sawblade known in the art. In some embodiments, the top cover 102a and the annular cover 102b measured across opposite ends of the outer perimeter 116a/116b may have a diameter between 22"-30". This is substantially the diameter of typical sawblades known in the art.

In one embodiment, an outer lip 118b extends along the length of the outer perimeter 116b; an inner lip 114a extends along the length of the inner perimeter 112a; and an inner lip 114b extends along the length of the inner perimeter 112b. The outer lips 118b is protruded from the containment face 104b. The inner lips 114a/114b are protruded from the base face 108a and the containment face 104b correspondingly. Thus, the sawblade 200 (referring to FIG. 7) can rest on the containment face 104a, 104b and be inhibited from lateral sliding, as the outer lips 118b serve as peripheral barriers to inhibit lateral movement across the containment face 104a. Furthermore, the inner lip 114a may stabilize the sawblade 200 (referring to FIG. 7) since the inner lip 114a may provide an additional force to the sawblade 200 (referring to FIG. 7). Also, the inner lip 114b may serve as a pad to elevate the sawblade 200 (referring to FIG. 7) and further prevent unnecessary abrasion of the sawblade 200 (referring to FIG. 7) against the containment face 104b that may dull the sawblade 200 (referring to FIG. 7).

As referenced in FIGS. 1-3, the top cover 102a comprises four depressions 110a as an, example. However, the amount of the depression 110a is not limited. There are two depressions 110a located at the flange 126a; and there are two depressions 110a located at the flat extension 124a.

Referring to FIGS. 1 and 4-5, the at least one protrusion 106b of the annular cover 102b protruded from the containment face 104b. More specifically, there are two protrusion 106b located at the flange 126a; and there are two protrusion 106b located at the flat extension 124a. Also, there are two depressions 110b located at the flange 126b; and there are two depressions 110b located at the flat extension 124b. The location of the protrusions 106b and the depressions 110b are matched.

Turning back to FIG. 1, the four protrusions 106b of the annular cover 102b are in general alignment with the four depressions 110a of the top cover 102a; whereby each protrusion 106b is configured to form a snap-fit relationship with the corresponding depression 110a. This creates closure and forms an inner cavity 120b between the base face 108a and the containment face 104b in which at least one sawblade is contained.

In this manner, the containment face 104b from at least one of the annular cover 102a, and the base face 108a from the top cover 102a can be detachably connected, forming an inner cavity 120b and a stacked arrangement.

Referring to FIGS. 1-5, a flange 126a extends from the outer perimeter 116a of the top cover 102a. A flange 126b extends from the outer perimeter 116b of the annular cover 102b. The flanges 126a/126b may have a generally rectangular shape. Elongated slots 136a/136b form at one end of the flange 126a/126b correspondingly. The elongated slots 136a/136b may be, used for hanging the assembly 100, as for merchandising, packaging, and storage. The elongated slots 136a/136b are also effective for aligning the top cover 102a and the annular cover 102b.

The flange 126b comprises a flange depression 128b that positions generally central in the flange 126b. A depressed edge 130b forms the perimeter of the flange depression 128b. The flange depression 128b is configured to securely retain a tag 138b. Those skilled in the art will recognize that the tag 138b is used to digitally track merchandise, which provides an integrated security feature in the assembly 100. The tag 138b may be used to identify and track the annular cover 102b or the sawblades contained within each annular cover. In the present application, the tag 138b is a sensor tag as an example. However, in other embodiments, the flange depression 128b may retain a simple label that identifies the annular cover 102b tor the sawblades contained within.

A flange cover 132b securely affixes over the flange depression 128b. The flange cover 132b may be transparent to enable visibility of the tag 138b contained within the flange depression 128b. The flange cover 132b is shaped and sized substantially the same as the flange depression 128b to create a snug mating relationship.

A flange cover 132b securely affixes over the flange depression 128b. The flange cover 132b may be transparent to enable visibility of the tag 138 contained within the flange depression 128b. The flange cover 132b is shaped and sized substantially the same as the flange depression 128b to create a snug mating relationship.

Further, the flange cover 132b has a ridged edge 134b that engages the depressed edge 130b of the flange depression 128b. This forms a snap-fit relationship between the flange cover 132b and the flange depression 128b. However in other embodiments, a plurality of flange tabs may extend from the ridged edge 134b of the flange cover 132b to engage the depressed edge 130b of the flange depression 128b in a snap-fit relationship.

As shown in FIG. 1, a flat extension 124a extends from the outer perimeter 116a of the top cover 102a. A flat extension 124b extends from the outer perimeter 116b of the annular covers 102b. The flat extensions 124a/124b are diametrically opposed from the flange 126a/124b. The flat extension 124a/124b may have a wide base that enables upright standing of the assembly 100. The flat, extension 124a/124b can also serve as a spacer during packaging and shipping of the assembly 100.

Figure 6:
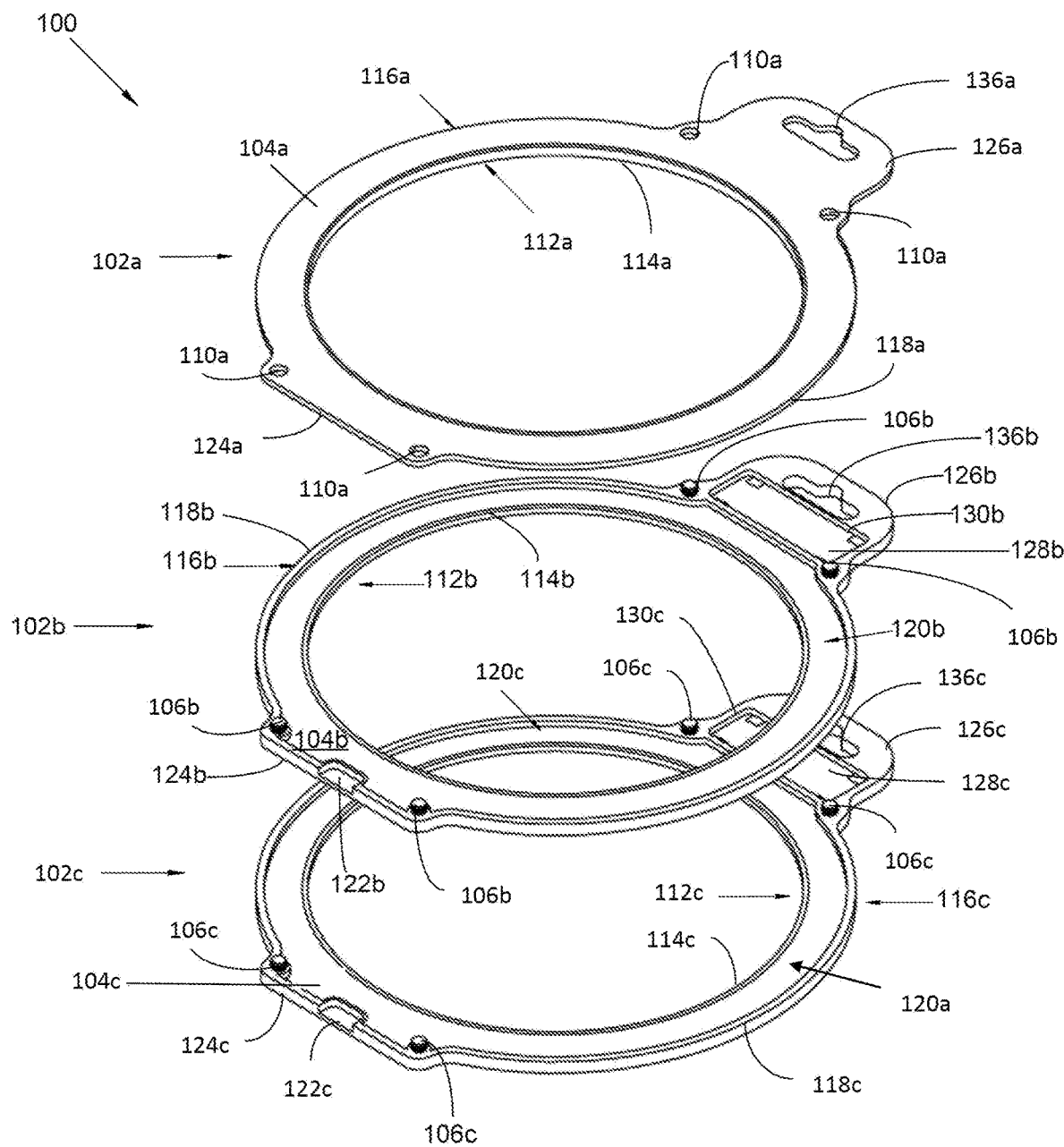
FIG. 6 illustrates a perspective view of the top cover and two annular covers.

As discussed above, the outer lips 118b form a peripheral barrier that inhibits lateral slippage of the sawblades 200 (referring to FIG. 7) while in the inner cavity 120b (referring to FIG. 6). The annular cover 102b also utilizes at least one recess 122b located at the flat extension 124b to make the stacked annular covers be separated more conveniently.

FIG. 6 illustrates a perspective view of the top cover 102a and two annular covers 102b/102c.

The annular covers can be stacked to any number, so as to retain a large number of sawblades in a stacked arrangement. Also, multiple sawblades can be contained in each formed inner cavities. The sawblades are also inhibited from lateral sliding through the outer lips.

For example, additional annular cover 102c can also be stacked, with a subsequent base face 108b engaging a subsequent containment face 104c (not separately labeled) to form as many inner cavities as needed.

The annular cover 102c is the same as the annular cover 102b. In detail, the annular cover 102c comprises a containment face 104c, a bottom face (not separately labeled), depressions (not separately labeled), an inner perimeter 112c, an inner lip 114c, an outer perimeter 116c, an outer lip 118c, an inner cavity 120c, a recess 122c, a flat extension 124c, a flange 126c, a flange depression 128c, a depressed edge 130c, an elongated slot 136c.

Specifically, the inner cavities 120b/120c are defined by the outer lips 118b/118c. For example, the inner cavity 120b is formed after cover the top cover 102a onto the annular cover 120b, making the base face 108a of the top cover 102a to be connected to the outer lip 118b. Therefore, the inner cavity 120b is formed for the sawblade. The inner cavity 120c is formed after cover the annular cover 102b onto the annular cover 120c, making the base face 108b of the annular cover 102b to be connected to the outer lip 118c. Therefore, the inner cavity 120c is formed for the sawblade. A volume of the inner cavity 120b/120c is an area enclosed by a circumference of the outer lip 118b/118c multiply by a height of the outer lip 118b/118c.

Figure 7:
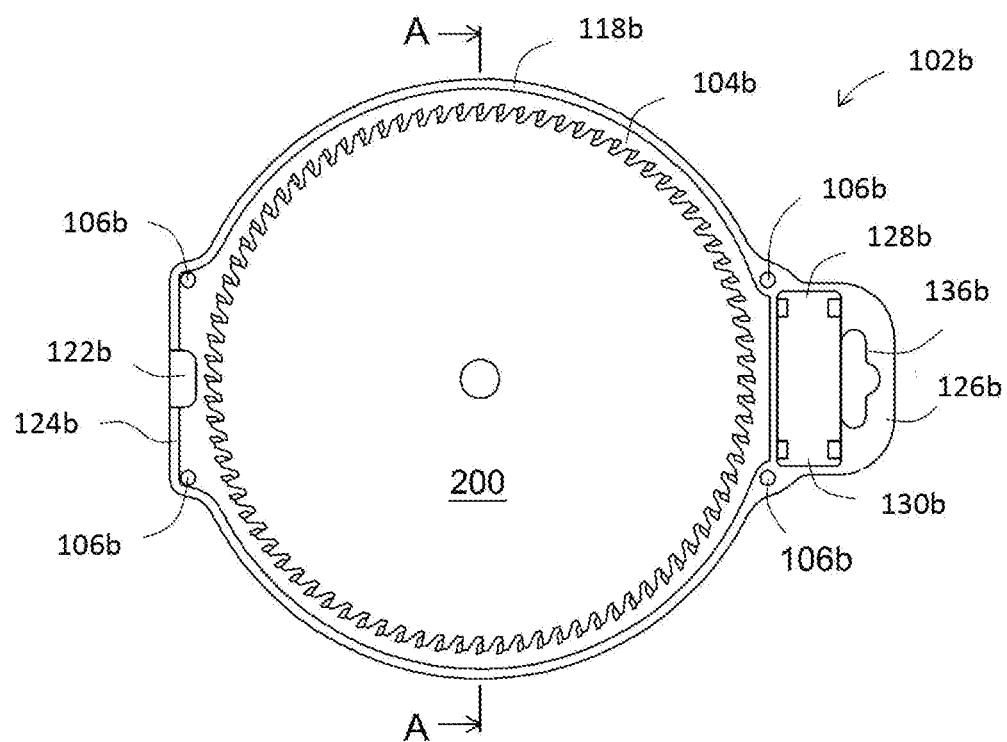
FIG. 7 illustrates a top view of the annular cover with a sawblade.
Figure 8:
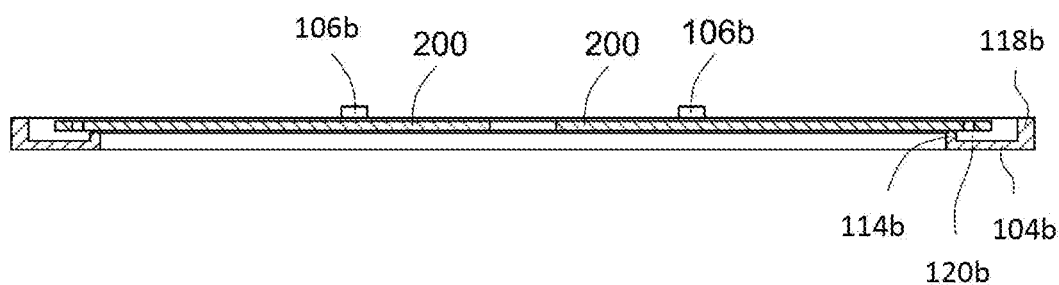
FIG. 8 is a cross-sectional view of the annular cover with the sawblade taken along the line A-A of FIG. 7.

FIG. 7 illustrates a top view of the annular cover 102b with a sawblade 200. FIG. 8 is a cross-sectional view of the annular cover 102b with the sawblade 200 taken along the line A-A of FIG. 7.

In operation, as FIGS. 6-7 illustrates, at least one sawblade 200 is initially positioned coplanar to the containment face 104b of a annular cover 102b. The sawblade 200 is placed within the confines of the outer lips 118b. The recess 122b/112c may make the stacked annular covers be separated more conveniently. A base face 108b of the annular cover 102b is aligned with the containment face 104c of the annular cover 102c. The depressions 110a of the top cover 102a are aligned with the protrusions 106b of the annular cover 102b. The depressions 110b of the annular cover 102b are aligned with the protrusions 106c of the annular cover 102c. The corresponding flanges 126a/126b/126c and flat extensions 124a/124b/124c are also aligned. The top cover 102a and the annular cover 102b are moved together until a snap-fit closure occurs between the depressions 110a and the protrusions 106b; the annular cover 102b and the annular cover 102c are moved together until a snap-fit closure occurs between the depressions 110b and the protrusions 106c. The sawblades then can be secured inside the inner cavities 120b/120c.

More than two annular covers may continue stacking and containing sawblades in this manner.

Referring to FIGS. 7-8, the sawblade 200 is disposed inside the inner cavity 120a. Specifically, the sawblade 200 is in the area inside the outer lip 118a. The inner lip 114a works as a pad for elevating the sawblade 200 from unnecessary abrasion against the containment face 104a that may dull the sawblade 200 as shown in FIG. 8.

Based on the above, the stackable sawblade containment assembly of the present application can provide the efficient storage capacity for the sawblades by stacking the plurality of sawblades within, one containment assembly. The depression and the protrusion provide the user a more stable and easier way to assemble and dissemble the stackable sawblade containment assembly.

In addition, the flat extension may also allow the user to stand the stackable sawblade containment assembly uprightly, making the overall storage more convenient. Furthermore, the flange depression allows the user to put the tag to differentiate different sawblades. The transparent structure may provide clearer vision.

These and other advantages of the invention will be further understood and appreciated by those skilled in the art by reference to the following written specification, claims and appended drawings. Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

It will be apparent to those skilled in the art that various modifications and variations can be made to the structure of the present application without departing from the scope or spirit of the present application. In view of the foregoing, it is intended that the present application cover modifications and variations of this application provided they fall within the scope of the following claims and their equivalents.

What is claimed is:

1. A stackable sawblade containment assembly, comprising:
   a plurality of annular covers defined by an outer perimeter, wherein each individual annular cover comprises a containment face and a base face, wherein at least one protrusion and at least one depression are coupled to the annular cover;
   an outer lip disposed to extend along the outer perimeter and extending from the containment face; and
   a top cover comprising at least one depression and lacks any protrusion, wherein the top cover comprises a top surface and a bottom surface, the top surface is flat;
   whereby the at least one protrusion is disposed in general alignment with the at least one depression, whereby the at least one protrusion is configured to form a snap-fit relationship with the at least one depression,
   whereby the containment face from one of the plurality of annular covers, and the base face from another one of the plurality of annular covers are detachably connected, forming an inner cavity and a stacked arrangement of annular covers.

2. The stackable sawblade containment assembly as claimed in claim 1, further comprising a flange disposed to extend from the outer perimeter of the plurality of annular covers.

3. The stackable sawblade containment assembly as claimed in claim 2, further comprising a flange cover defined by a ridged edge, wherein the flange comprises a flange depression defined by a depressed edge, the flange cover is configured to cover the flange depression, whereby the ridged edge of the flange cover forms a snap-fit relationship with the depressed edge of the flange depression.

4. The stackable sawblade containment assembly as claimed in claim 3, wherein the flange depression is configured to enable retention of a tag.

5. The stackable sawblade containment assembly as claimed in claim 4, wherein the tag is configured to identify the plurality of annular covers and the at least one sawblade, the tag further configured to position in the flange depression.

6. The stackable sawblade containment assembly as claimed in claim 3, wherein the flange depression has a generally rectangular shape.

7. The stackable sawblade containment assembly as claimed in claim 2, wherein the at least one protrusion and the at least one depression are located at the flange.

8. The stackable sawblade containment assembly as claimed in claim 2, wherein the flange comprises an elongated slot.

9. The stackable sawblade containment assembly as claimed in claim 1, further comprising a flat extension disposed to extend from the outer perimeter of the plurality of annular covers.

10. The stackable sawblade containment assembly as claimed in claim 9, wherein the flat extension is diametrically opposed from the flange.

11. The stackable sawblade containment assembly as claimed in claim 9, wherein the flat extension is configured to enable upright standing of the plurality of annular covers.

12. The stackable sawblade containment assembly as claimed in claim 9, further comprising at least one recess located on the flat extension.

13. The stackable sawblade containment assembly as claimed in claim 9, wherein the at least one protrusion and the at least one depression are located at the flat extension.

14. The stackable sawblade containment assembly as claimed in claim 1, wherein the plurality of annular covers is at least partially transparent.

15. The stackable sawblade containment assembly as claimed in claim 1, wherein the plurality of annular covers is fabricated from a polymer.

16. The stackable sawblade containment assembly as claimed in claim 1, wherein the inner cavity is defined by the outer lip and is adapted to enable containment of at least one sawblade.

17. The stackable sawblade containment assembly as claimed in claim 16, wherein the outer lip is configured to inhibit lateral shifting by the at least one sawblade.

18. The stackable sawblade containment assembly as claimed in claim 17, wherein the plurality of annular covers is configured to be stacked, and with each set of annular covers containing the at least one sawblade.

19. The stackable sawblade containment assembly as claimed in claim 1, wherein the plurality of annular covers has a diameter between the outer perimeters between 22 to 30 inches.

* * * * *